(12) United States Patent
Park

(10) Patent No.: US 12,015,466 B2
(45) Date of Patent: Jun. 18, 2024

(54) METHOD AND APPARATUS FOR TRANSMITTING AND RECEIVING REFERENCE SIGNAL FOR SIDELINK CHANNEL STATE INFORMATION ACQUISITION

(71) Applicant: KT CORPORATION, Seongnam-si (KR)

(72) Inventor: Kyujin Park, Seongnam-si (KR)

(73) Assignee: KT CORPORATION, Seongnam-si (KR)

( * ) Notice: Subject to any disclaimer, the term of this patent is extended or adjusted under 35 U.S.C. 154(b) by 0 days.

(21) Appl. No.: 17/956,755

(22) Filed: Sep. 29, 2022

(65) Prior Publication Data

US 2023/0024314 A1  Jan. 26, 2023

Related U.S. Application Data

(62) Division of application No. 16/830,482, filed on Mar. 26, 2020, now abandoned.

(30) Foreign Application Priority Data

Mar. 29, 2019 (KR) .................. 10-2019-0037264
Feb. 21, 2020 (KR) .................. 10-2020-0021590

(51) Int. Cl.
  *H04B 7/06*   (2006.01)
  *H04L 1/00*   (2006.01)
  *H04L 5/00*   (2006.01)
  *H04W 76/14*  (2018.01)

(52) U.S. Cl.
  CPC ......... *H04B 7/0626* (2013.01); *H04L 1/0026* (2013.01); *H04L 5/0048* (2013.01); *H04L 5/0057* (2013.01); *H04L 5/0092* (2013.01); *H04W 76/14* (2018.02)

(58) Field of Classification Search
  CPC .................................................. H04B 7/0626
  See application file for complete search history.

(56) References Cited

U.S. PATENT DOCUMENTS

| | | | |
|---|---|---|---|
| 2020/0112400 A1* | 4/2020 | Lee | H04L 5/0055 |
| 2021/0194557 A1  | 6/2021 | Wang et al. | |
| 2021/0219268 A1* | 7/2021 | Li | H04W 72/20 |
| 2021/0266995 A1  | 8/2021 | Osawa et al. | |
| 2021/0306999 A1* | 9/2021 | Zhao | H04W 72/20 |
| 2021/0329603 A1* | 10/2021 | Zhao | H04W 72/542 |
| 2021/0385842 A1  | 12/2021 | Zhao et al. | |
| 2022/0014338 A1* | 1/2022 | Yoshioka | H04W 8/005 |
| 2022/0069879 A1* | 3/2022 | Wernersson | H04B 7/0658 |
| 2022/0191831 A1* | 6/2022 | Park | H04L 5/0053 |

\* cited by examiner

*Primary Examiner* — Jason E Mattis
(74) *Attorney, Agent, or Firm* — INVENSTONE PATENT, LLC

(57) ABSTRACT

Methods and apparatuses are provided for transmitting/receiving a reference signal for sidelink channel state information acquisition. In particular, a method of a transmitter UE is provided for transmitting a reference signal in order to acquire sidelink channel state information. The method may include: receiving enabling information of sidelink channel state information (CSI) reporting, determining whether to transmit a sidelink channel state information reference signal (SL CSI-RS) based on the enabling information of the CSI reporting, and transmitting the SL CSI-RS within a resource assigned for physical sidelink shared channel (PSSCH) transmission to the a receiver UE.

9 Claims, 19 Drawing Sheets

D2D signal transmission from a UE allocated with unit #0

METHOD AND APPARATUS FOR TRANSMITTING AND RECEIVING REFERENCE SIGNAL FOR SIDELINK CHANNEL STATE INFORMATION ACQUISITION

CROSS-REFERENCE TO RELATED APPLICATION

The present application is a divisional of U.S. patent application Ser. No. 16/830,482, filed on Mar. 26, 2020, which claims priority under 35 U.S.C. § 119 to Korean Patent Application No. 10-2019-0037264, filed on Mar. 29, 2019 and No. 10-2020-0021590, filed on Feb. 21, 2020, which are hereby incorporated by reference in their entirety.

BACKGROUND

1. Technical Field

The present disclosure relates to methods and apparatuses for transmitting and receiving a reference signal in order to acquire sidelink channel information in a next-generation/5G radio access network (hereinafter, referred to as a new radio, "NR").

2. Description of the Related Art

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting any NR system.

To address such issues, a design is needed for transmitting a reference signal to a receiver user equipment (Rx UE) in order to acquire channel state information for transmission through a sidelink, which is a device-to-device radio link, for providing a V2X service in the NR, that is, NR sidelink transmission.

SUMMARY

In accordance with embodiments of the present disclosure, methods and apparatuses are provided for transmitting and receiving a reference signal between a transmitter user equipment (Tx UE) and a receiver user equipment (Rx UE) in order to acquire channel state information for sidelink transmission, in the NR.

In accordance with one aspect of the present disclosure, a method of a transmitter user equipment (Tx UE) is provided for transmitting a reference signal in order to acquire sidelink channel state information. The method may include: receiving enabling information of sidelink channel state information (CSI) reporting, determining whether to transmit a sidelink channel state information reference signal (SL CSI-RS) based on the enabling information of the CSI reporting, and transmitting the SL CSI-RS within a resource assigned for physical sidelink shared channel (PSSCH) transmission to the a Rx UE.

In accordance with another aspect of the present disclosure, a method of a receiver user equipment (Rx UE) is provided for receiving a reference signal in order to acquire sidelink channel state information. The method may include: receiving, from a transmitter user equipment (Tx UE), a sidelink channel state information reference signal (SL CSI-RS), which has been determined to be transmitted based on enabling information of CSI reporting, within a resource assigned for physical sidelink shared channel (PSSCH) transmission, and performing the CSI reporting based on the received SL CSI-RS.

In accordance with further another aspect of the present disclosure, a transmitter user equipment (Tx UE) is provided for transmitting a reference signal in order to acquire sidelink channel state information. The Tx UE may include: a receiver receiving enabling information of sidelink channel state information (CSI) reporting, a controller determining whether to transmit a sidelink channel state information reference signal (SL CSI-RS) based on the enabling information of the CSI reporting, and a transmitter transmitting the SL CSI-RS within a resource assigned for physical sidelink shared channel (PSSCH) transmission to the a receiver user equipment (Rx UE).

In accordance with yet another aspect of the present disclosure, a receiver user equipment (Rx UE) is provided for receiving a reference signal in order to acquire sidelink channel state information. The Rx UE may include: a receiver receiving, from a transmitter user equipment (Tx UE), a sidelink channel state information reference signal (SL CSI-RS), which has been determined to be transmitted based on enabling information of CSI reporting, within a resource assigned for physical sidelink shared channel (PSSCH) transmission, and a transmitter performing the CSI reporting based on the received SL CSI-RS.

In accordance with embodiments of the present disclosure, methods and apparatuses are provided for transmitting and/or receiving a reference signal between a transmitter UE and a receiver UE in order to acquire channel state information for sidelink transmission, in the NR.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
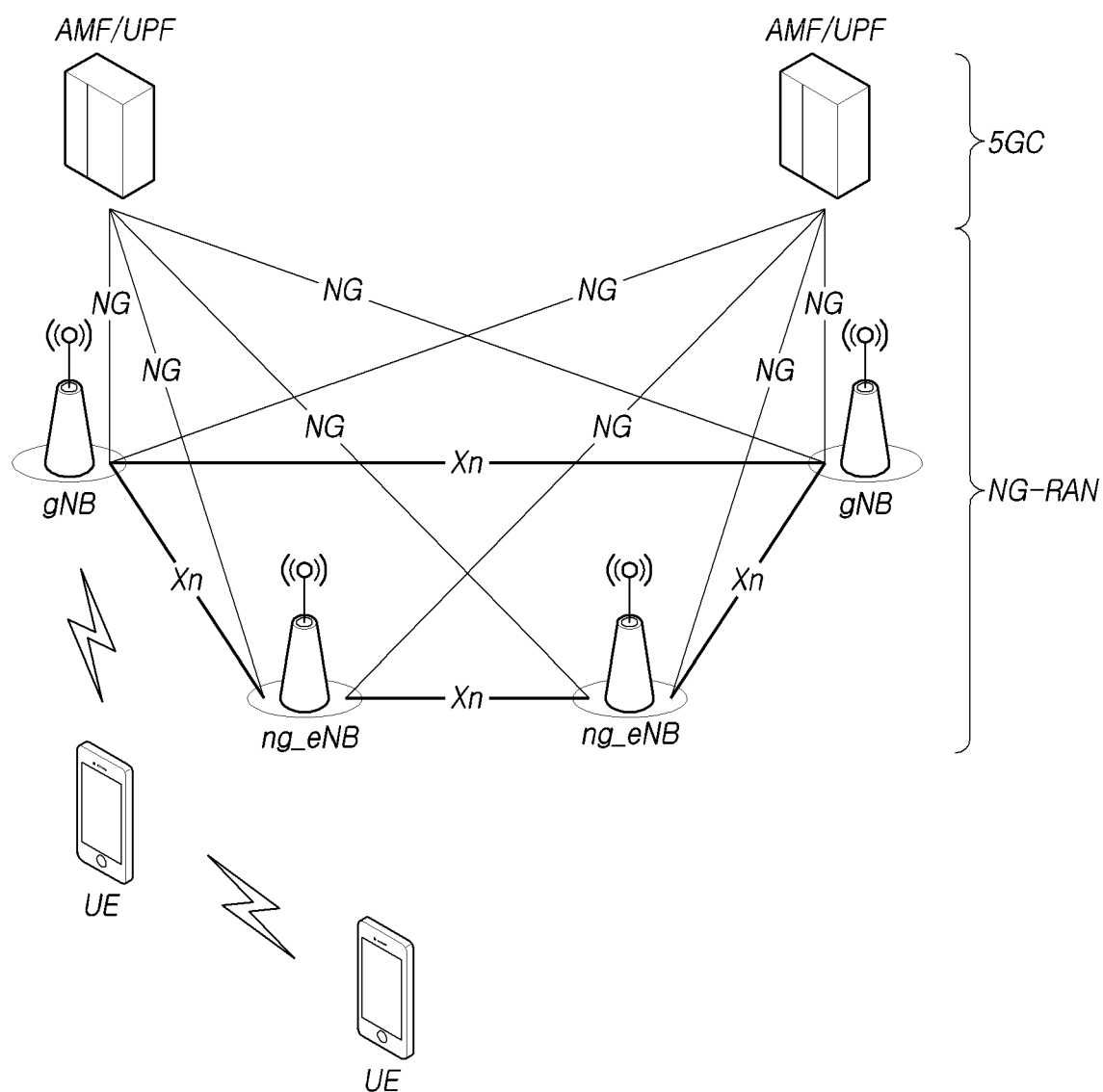
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3$^{rd}$ generation partnership project (3GPP), 3GPP2, WiFi, Bluetooth, institute of electrical and electronic engineers (IEEE), international telecommunication union (ITU), or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Furthermore, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to data transmission and reception from a UE to a base station, and a downlink (DL) refers to data transmission and reception from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT-s)-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 to be changed exponentially on the basis of 15 kHz.

TABLE 1

| $\mu$ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
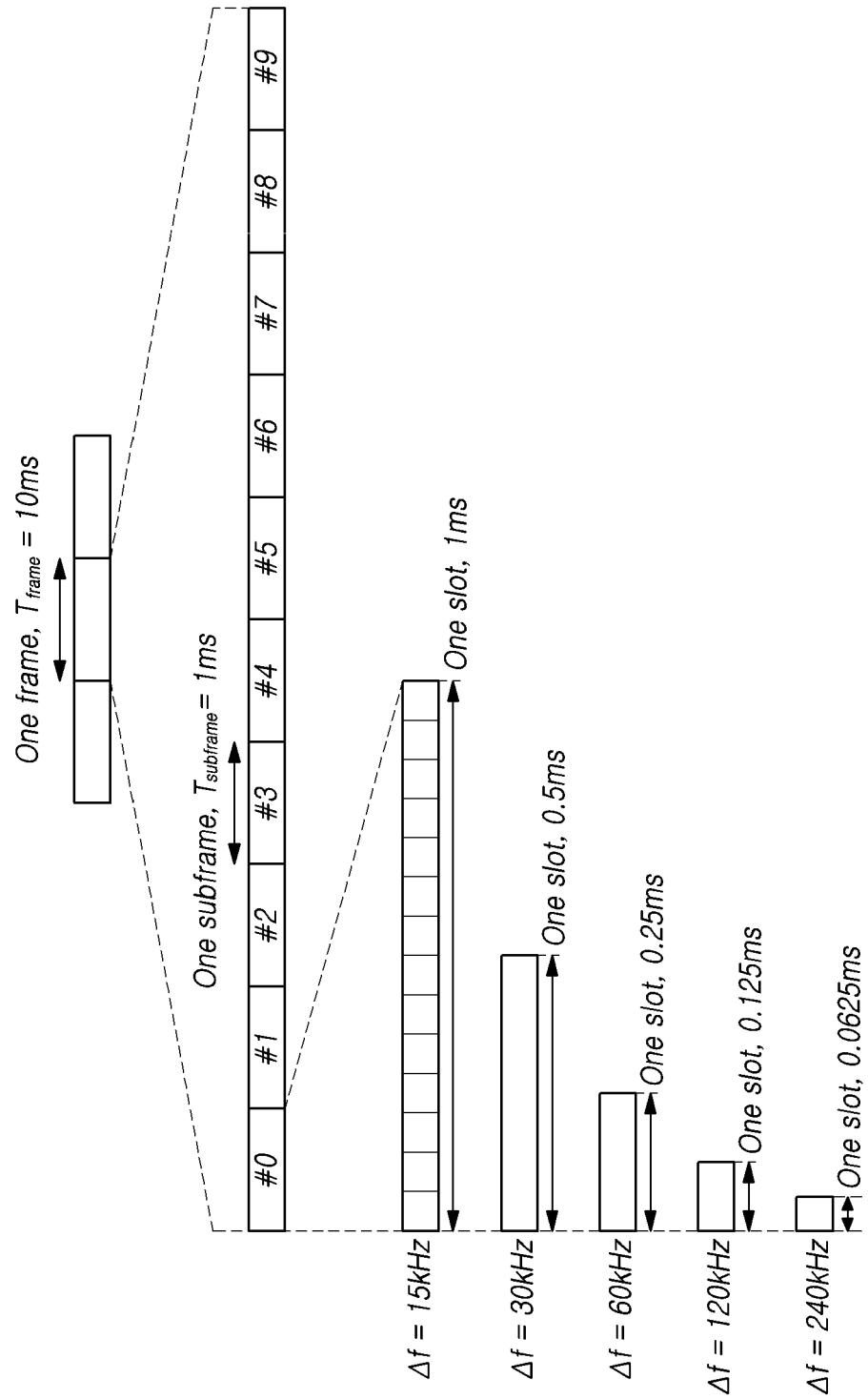
FIG. 2 schematically illustrates a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and has a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically inform the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
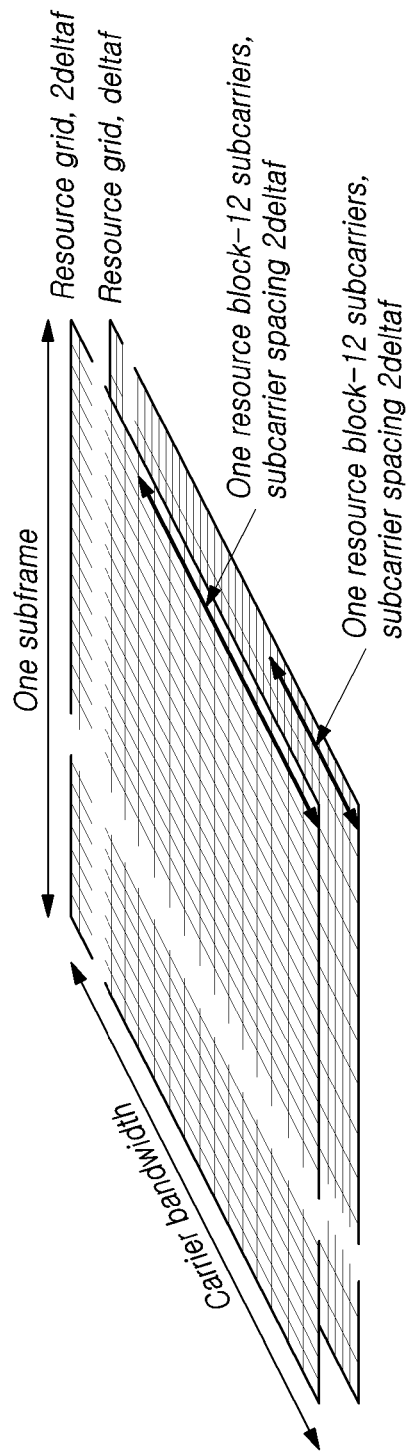
FIG. 3 illustrates resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
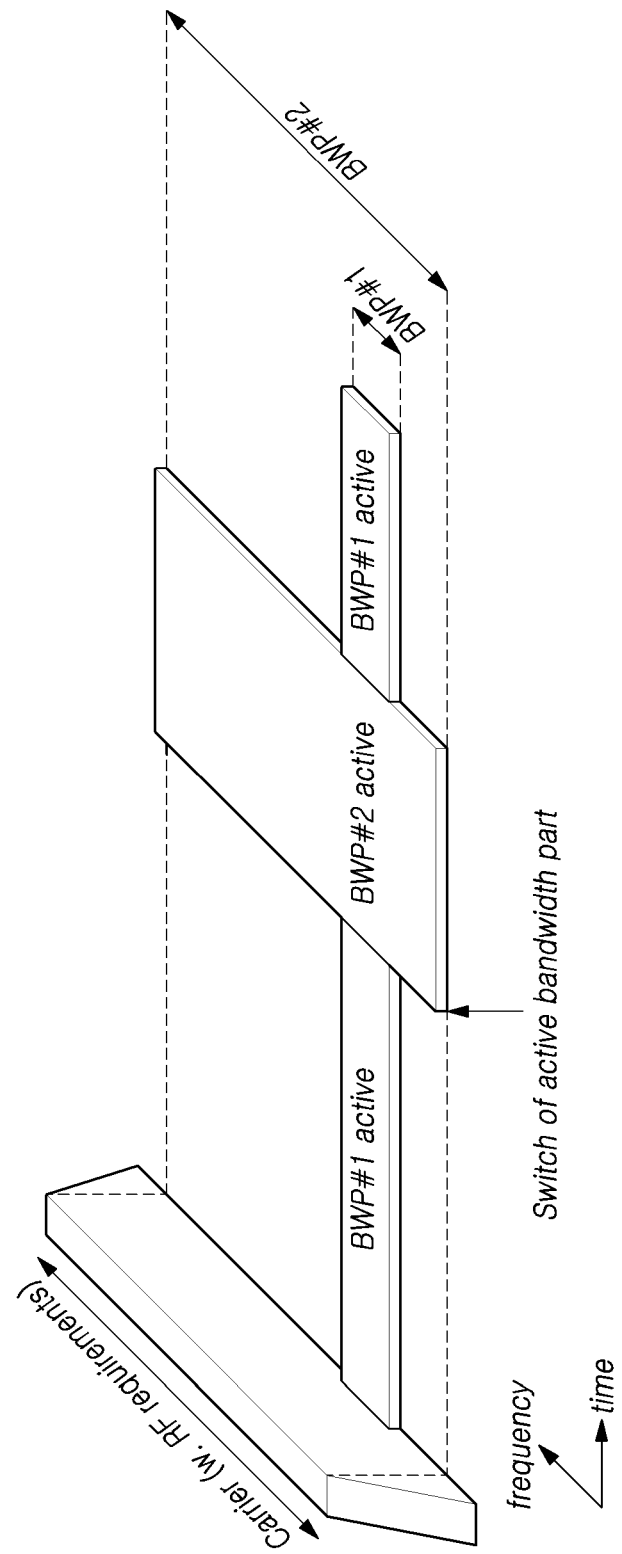
FIG. 4 illustrates bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
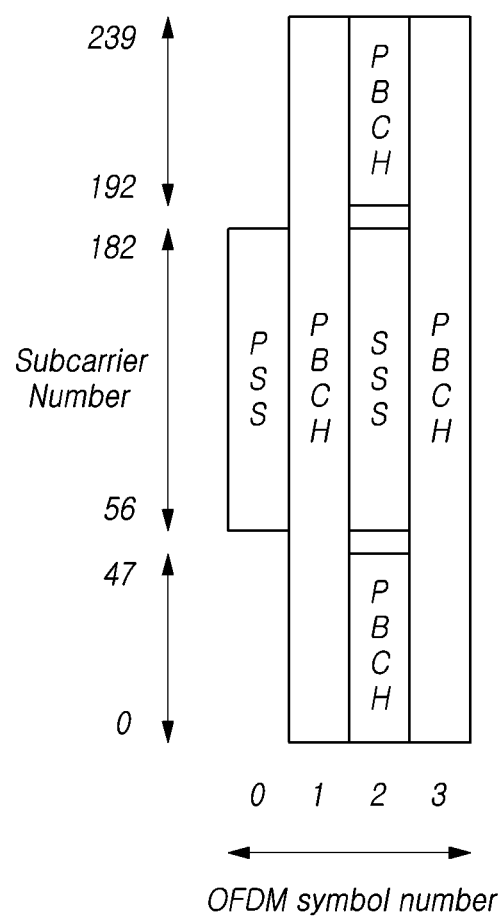
FIG. 5 illustrates an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIB s may be transmitted according to the request of the UE.

Figure 6:
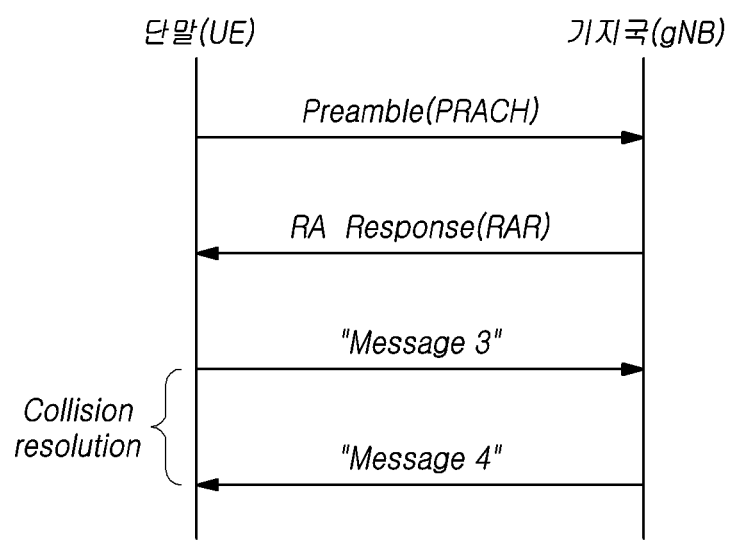
FIG. 6 is a signal diagram for explaining a random access procedure in a radio access technology in accordance with embodiments of the present disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
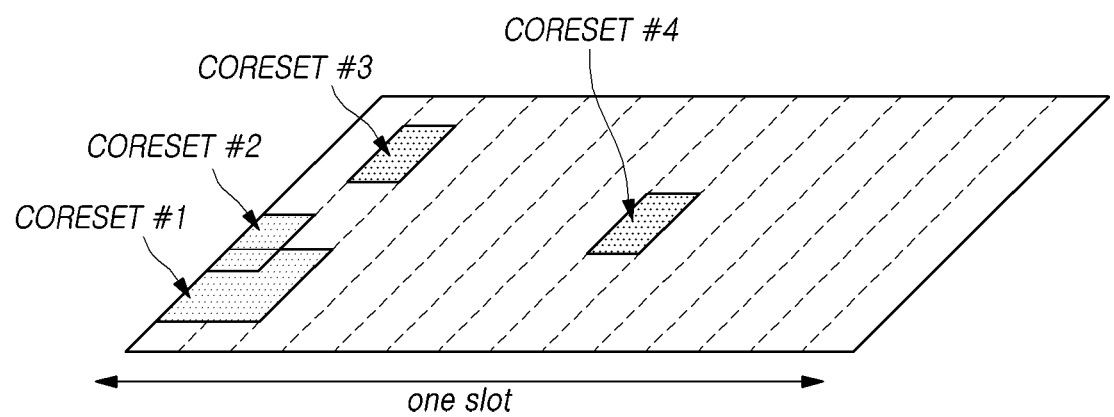
FIG. 7 illustrates CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

<LTE sidelink>

In the LTE system, for providing device-to-device communication and vehicle-to-everything (V2X) (in particular, vehicle-to-vehicle (V2V)) service, designs for a radio channel and a radio protocol for direct communication (i.e. sidelink) between devices have been developed.

With respect to the sidelink, a synchronization signal (PSSS/SSSS) for synchronizing between a radio sidelink transmission end and a radio sidelink reception end, and a physical sidelink broadcasting channel (PSBCH) for transmitting/receiving a sidelink master information block (MIB) related to this have been defined. Further, designs have been conducted on a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

In order to assign a radio resource for the sidelink, two modes have been developed, i.e. i) mode 1 in which a base station assigns a radio resource and ii) mode 2 in which a UE selects and assigns a radio resource from a radio resource pool. Further, in order to satisfy the V2X scenario in the LTE system, a related technology has been required to be developed additionally.

In such an environment, the 3GPP have introduced 27 service scenarios related to vehicle recognition/detection in Rel-14, and determined key performance requirements according to road conditions. In addition, the 3GPP have introduced 25 service scenarios, such as vehicle platooning, advanced driving, remote driving, an extended sensor, or the like, evolved from Rel-14, and determined 6 performance requirements in Rel-15.

In order to satisfy such performance requirements, developments have been conducted for improving the performance of the sidelink technology developed based on the typical D2D communication to meet requirements of the V2X. In particular, in order to apply to the C-V2X (Cellular-V2X), a technology for improving a design of the physical layer of the sidelink to be adapted to a high-speed environment, a resource assignment technology, a synchronization technology may be selected as further study items.

The sidelink described below means a link used in D2D communication after Rel-12 of the 3GPP and V2X communication after Rel-14, and the terms for each channel, synchronization signal, and resource are described using equal terms without differently being defined according to requirements of the D2D communication, requirements of the V2X communication in Rel-14 and Rel-15. This is for convenience of description and ease of understanding, and when needed, embodiments will be described by focusing on a difference of the sidelink satisfying V2X scenario requirements relative to the sidelink for the D2D communication in Rel-12/13. Accordingly, the terms related to the sidelink discussed below are classified into D2D communication, V2X communication, and C-V2X communication for merely comparison between them and ease of understanding; therefore, such terms are not limited to a specific scenario.

<Resource Assignment>

Figure 8:
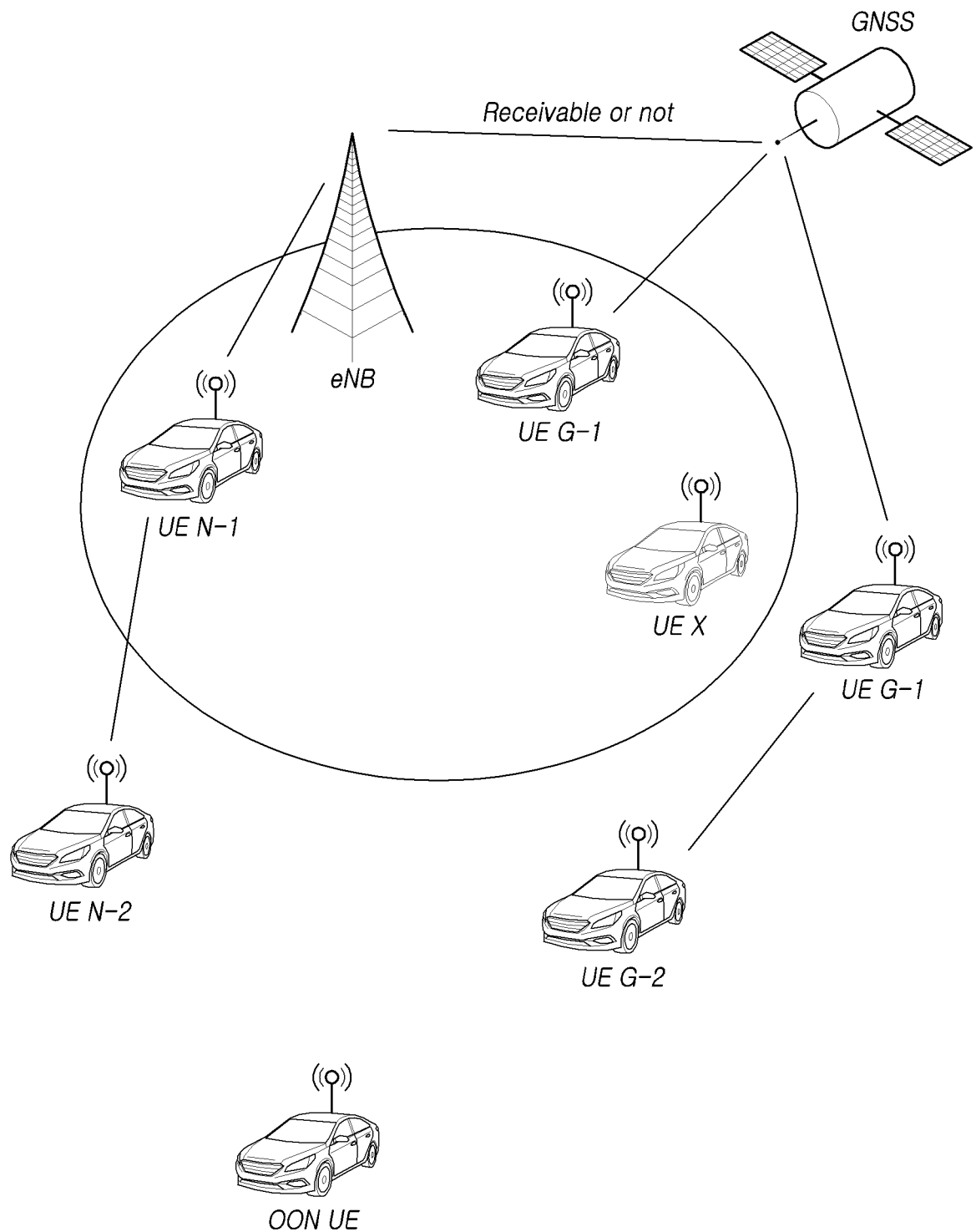
FIG. 8 illustrates various scenarios for V2X communication.

FIG. 8 illustrates various scenarios for V2X communication.

Referring to FIG. 8, a V2X device (represents a vehicle; however, may be replaced with other devices, such as a user equipment (UE), etc.) may be located in coverage of a base station (e.g., an eNB, a gNB, or an ng-eNB), or located outside of coverage of the base station. For example, communication may be performed between UEs (e.g., UE N-1, UE G-1, UE X) in coverage of the base station, or communication may be performed between a UE in coverage of the base station and a UE (e.g., UE N-1, UE N-2) outside of coverage of the base station. Alternatively, communication may be performed between UEs (e.g., UE G-1, UE G-2) out of coverage of the base station.

In such various scenarios, it is necessary to assign a radio resource for enabling a corresponding UE to perform communication using the sidelink. The assignment of the radio resource includes a method of a base station for handling the assignment of the radio resource and a method of a UE on its own selects and assigns the radio resource.

Specifically, in the D2D, for enabling a UE to assign a resource, two modes are defined, that is, i) a centralized mode (mode 1) in which a base station intervenes in the selection and management of the resource, and ii) a distributed mode (mode 2) in which a UE selects randomly one or more of pre-configured resources. Similar to the D2D, other modes are defined, such as, iii) a third mode (mode 3) in which a base station intervenes in the selection and management of the resource in the C-V2X, and iv) a fourth mode (mode 4) in which a vehicle directly selects a resource in the V2X. In the third mode (mode 3), a base station provides a schedule of a scheduling assignment (SA) pool resource area and a data pool resource area assigned to this to a transmitter UE.

Figure 9A:
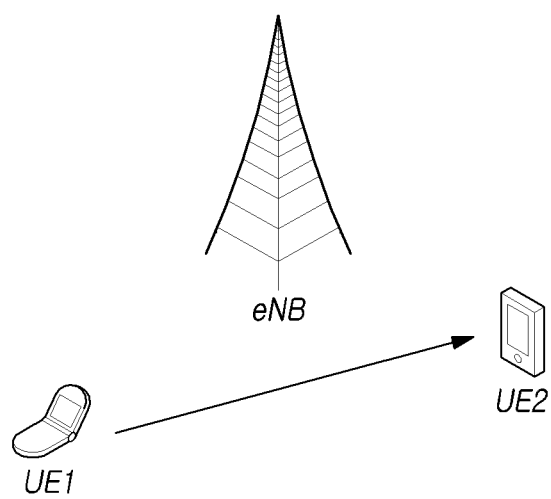
FIG. 9A illustrates a first user equipment (UE1) and a second user equipment (UE2) performing sidelink communication.
Figure 9B:
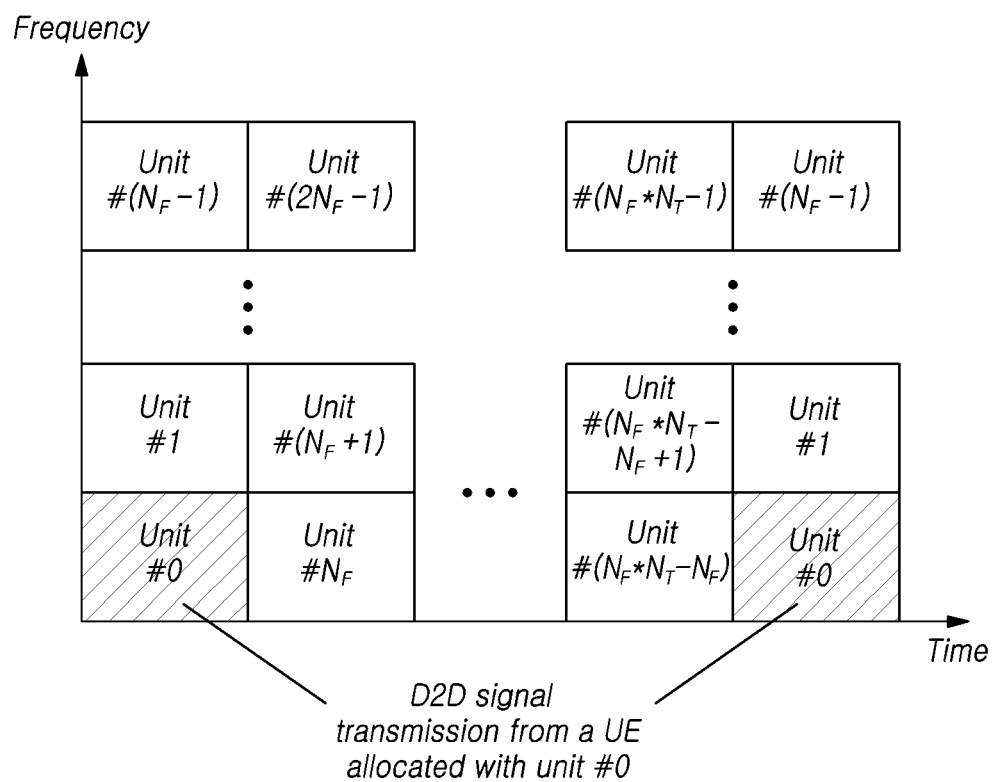
FIG. 9B illustrates an example of resource pools for user equipments.

FIG. 9A illustrates a first user equipment (UE1) and a second user equipment (UE2) performing sidelink communication, and FIG. 9B illustrates an example of resource pools used by the UEs.

Referring to FIG. 9, an eNB represents a base station; however, the embodiments are not limited thereto. For example, a gNB or an ng-eNB may represent the base station as well. Further, the UEs represents mobile terminals; however, the embodiments are not limited thereto. For example, the UEs may represent vehicles, infrastructures, or the like depending on scenarios or situations.

In FIG. 9A, the transmitter UE (UE 1) may select a resource unit corresponding to a specific resource within a resource pool including a set of resources, and transmit a sidelink signal using the resource unit. The receiver UE (UE 2) may be configured with a resource pool over which the UE 1 is allowed to transmit a signal, and detect a transmission signal from the UE 1.

If the UE 1 is in coverage of the base station, that is, available to receive services or signals from the base station, the base station may provide the resource pool to the UE 1. If the UE 1 is out of coverage of the base station, that is, unavailable to receive services or signals from the base station, the resource pool may be determined as one or more resources which are pre-configured or provided by another UE. Normally, the resource pool is made up of a plurality of resource units, and each UE may select one or more resource units and use the selected resource unit(s) for transmitting a sidelink signal.

Referring to FIG. 9B, the entire frequency resource is divided into NF frequency resources, and the entire time resource is divided into NT time resources. Thus, a total of NF*NT resource units may be defined. In this case, it is possible to express that a corresponding resource pool is repeated at a period of NT subframes. In particular, one resource unit may be configured to be provided periodically and repeatedly, as illustrated in FIG. 9B.

The resource pool may be classified into several types according to a certain criterion. For example, the resource pool may be classified into several types according to contents of a sidelink signal transmitted over each resource pool. As one example, the contents of the sidelink signal may be classified, and a separate resource pool may be configured for each of the contents. Scheduling assignment (SA), a sidelink channel, a discovery channel, or the like may be examples of the contents of the sidelink signal.

The SA may be a signal including information, such as, a location of a resource used to transmit a subsequent sidelink data channel by a transmitter UE, a modulation and coding scheme (MCS) that is needed to demodulate a data channel, a MIMO transmission scheme, timing advance (TA), or the like. This signal may be transmitted by being multiplexed with sidelink data over an identical resource unit as well. In this case, the SA resource pool may mean a pool of resources over which the SA is transmitted by being multiplexed with the sidelink data.

An FDM scheme applied to the V2X communication may cause a time delay until a data resource is assigned after a SA resource has been assigned to be reduced. For example, it is possible to consider a non-adjacent scheme in which a control channel resource and a data channel resource are split in time domain in one subframe, an adjacent scheme in which a control channel and a data channel are consecutively assigned in one subframe, or the like.

When the sidelink data along with the SA are multiplexed and transmitted over an identical resource unit, a sidelink data channel only in a different form from SA information may be transmitted over a resource pool for the sidelink data channel. In other words, resource elements used to transmit SA information over one or more individual resource units within a SA resource pool may be used still for transmitting sidelink data in a sidelink data channel resource pool. The discovery channel may be a resource pool for a message for enabling a transmitter UE to transmit information, such as an ID of the transmitter UE, or the like, and a neighboring UE to discover the transmitter UE. Even when contents of the sidelink signal are equal, different resource pools may be used according to transmission and/or reception characteristics of the sidelink signal.

For example, in even the case of an identical sidelink data channel or a discovery message, a different resource pool may be used according to a method of determining a transmission timing of a sidelink signal (e.g., whether the sidelink signal is transmitted at the time of receiving a synchronization reference signal or transmitted by applying a certain TA from the time of receiving the synchronization reference signal) or a method of assigning a resource (e.g., whether a base station dedicates a resource for transmitting a signal to a transmitter UE or whether a transmitter UE on its own selects a resource for transmitting a signal in a pool), a signal format (e.g., the number of symbols occupied by each sidelink signal in one subframe, the number of subframes used for transmitting one sidelink signal), a signal strength of from a base station, a transmission power strength of a sidelink UE, or the like.

<Synchronization Signal>

As described above, a V2X communication UE may be located out of coverage of a base station. In even this situation, it is necessary for performing communication using the sidelink. To do this, it is important for a UE located out of coverage of the base station to achieve synchronization.

Hereinafter, a method of achieving time and frequency synchronization in sidelink communication, particularly in communication between vehicles, between a vehicle and a UE, or between a vehicle and a communication network will be described based on the description above.

The D2D communication utilizes a sidelink synchronization signal (SLSS), which is a synchronization signal transmitted from a base station for time synchronization between UEs. In the C-V2X, a satellite system (e.g., the Global Navigation Satellite System (GNSS)) may be additionally considered for enhancing synchronization performance. In this case, priority may be given to synchronization establishment or a base station may indicate information on priority. For example, when determining its transmission synchronization, a UE selects a synchronization signal directly transmitted from a base station as a highest priority, and, when the UE is out of coverage of the base station, synchronizes with the SLSS transmitted from another UE in coverage of the base station as a higher priority.

Since a wireless terminal (hereinafter, for convenience of description, may be referred to as the UE as well) installed in a vehicle, or a UE mounted in the vehicle has a less problem with battery consumption and can use a satellite signal such as the GPS for navigation purposes, the satellite signal may be used for configuring time or frequency synchronization between UEs. The satellite signal may include, as well as the Global Positioning System (GPS), the GLObal NAvigation Satellite System (GLONAS), GALILEO, BEIDOU, or the like.

The sidelink synchronization signal may include a primary sidelink synchronization signal (PSSS), a secondary sidelink synchronization signal (SSSS), or the like. The PSSS may include a Zadoff-chu sequence with a preconfigured length, a structure similar to the PSS, a structure changed from the PSS, or a structure in which the PSS is repeated. Unlike a DL PSS, a different Zadoff-chu root index (e.g. 26, 37) may be used. The SSSS may include an M-sequence, a structure similar to the SSS, a structure changed from the SSS, or a structure in which the SSS is repeated. In a situation where UEs synchronize with a base station, the SRN is served as the base station, and the SLSS is served as the PSS or the SSS.

Unlike the PSS/SSS of DL, the PSSS/SSSS uses an UL subcarrier mapping method. A physical sidelink synchronization channel (PSSCH) may be a channel for transmitting system information (e.g., information related to the SLSS, a duplex mode (DM), a TDD UL/DL configuration, information related to a resource pool, types of applications related to the SLSS, a subframe offset, broadcast information, or the like) which is basic information that the UE is required to identify first before transmitting/receiving a sidelink signal. The PSSCH may be transmitted over a subframe identical or subsequent to the SLSS. The DM-RS may be used for demodulation of the PSSCH.

The SRN may be a node for transmitting the SLSS, or the PSSCH. The SLSS may be in the form of a specific sequence, and the PSSCH may be a sequence representing specific information or in the form of a codeword after pre-defined channel coding has been performed. Here, a base station or a specific sidelink UE may be served as the SRN. A UE may be served as the SRN in the case of partial network coverage or out-of-network-coverage.

When needed, the SLSS may be relayed, for example, through multi-hop, for sidelink communication with an out-of-coverage UE. Relaying a synchronization signal in description below includes, as well as directly relaying a synchronization signal of a base station, transmitting a sidelink synchronization signal in a separate format at the time of receiving the synchronization signal. Like this, since the sidelink synchronization signal is relayed, direct communication between an in-coverage UE and an out-of-coverage UE may be performed.

<Nr Sidelink>

As described above, unlike the V2X based on the LTE system, NR-based V2X technology is required to be developed for satisfying complex requirements as in autonomous driving.

In accordance with embodiments of the present disclosure, it is possible to provide a flexible V2X service in more diverse environments by applying a frame structure, numerology, a channel transmission/reception procedure, or the like of the NR to the NR V2X. To this end, it is necessary to develop technologies, such as, a resource sharing technology between a base station and a UE, a sidelink carrier aggregation technology (CA), a partial sensing technology for a UE held by a pedestrian, a short transmission time interval (sTTI), or the like.

In the NR V2X, it has been determined to support unicast or groupcast, as well as broadcast used in the LTE V2X. In this case, it also has been determined to use a target group ID for the unicast or the groupcast, and but it has been determined to discuss later whether to use a source ID.

Further, as it has been determined to support HARQ for QOS, it has been determined that a HARQ process ID is included in control information. In the LTE HARQ, a PUCCH for the HARQ is transmitted after 4 subframes after DL has been transmitted. In the NR HARQ, for feedback timing, a PUCCH resource and a feedback timing may be indicated using a PUCCH resource indicator in DCI format 1_0 or 1_1 PUCCH or a HARQ feedback timing indicator in response to the PDSCH (PDSCH-to-HARQ feedback timing indicator).

Figure 10:
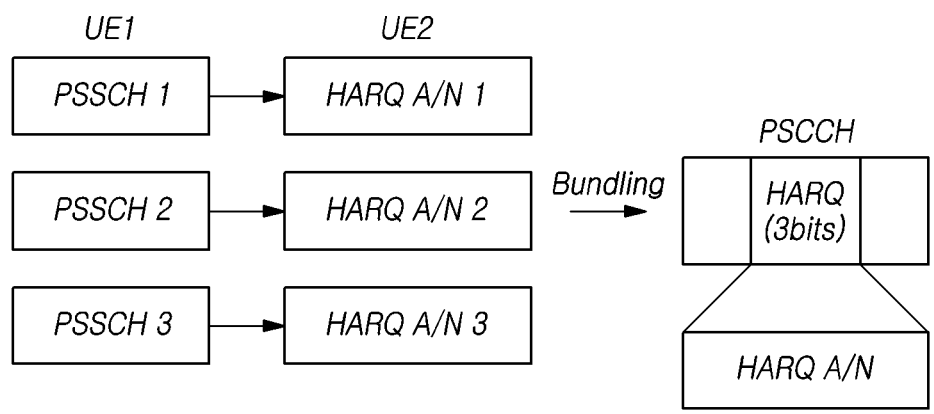
FIG. 10 illustrates a method of bundling and transmitting HARQ feedback information in the V2X.

FIG. 10 illustrates a method of bundling and transmitting HARQ feedback information in the V2X.

Referring to FIG. 10, in the LTE V2X, separate HARQ ACK/NACK information is not transmitted in order to reduce system overhead, and data are allowed to be retransmitted once according to discretion of a transmitter UE for data transmission safety. However, in the NR V2X, in terms of data transmission stability, HARQ ACK/NACK information may be transmitted. In this case, overhead may be reduced by bundling and transmitting the corresponding information.

That is, when a transmitter UE UE1 transmits three data transmissions to a receiver UE UE2, and then the receiver UE generates HARQ ACK/NACK information in response to the transmissions, this may be bundled and transmitted over a PSCCH. FIG. 10 illustrates that HARQ ACK/NACK is transmitted over the PSCCH. However, the HARQ ACK/NACK may be transmitted over a separate channel or another channel, and the bundled HARQ information may be configured with 3 bits or less.

In frequency range 1 (FR1) for a frequency range of 3 GHz or less, 15 kHz, 30 kHz, 60 kHz, and 120 kHz have been discussed as a candidate subcarrier spacing (SCS). In frequency range 2 (FR2) for a frequency range exceeding 3 GHz, 30 kHz, 60 kHz, 120 kHz, and 240 kHz have been discussed as a candidate subcarrier spacing (SCS). In the NR V2X, a minislot (e.g., 2/4/7 symbols) smaller than 14 symbols may be supported as a unit of minimum scheduling.

The DM-RS, the PT-RS, the CSI-RS, the SRS, and the AGC training signal have been discussed as a candidate of the RS.

The following four options have been discussed for multiplexing of a PSCCH and an associated PSSCH, as illustrated in FIG. 11. Option 2 is similar to the multiplexing of the PSCCH and the PSSCH in the LTE V2X.

Synchronization Mechanism

NR V2X sidelink synchronization may include one or more sidelink synchronization signals and the PSBCH, and a sidelink source may include a UE in addition to the GNSS, and/or the gNB.

Resource Assignment

At least two sidelink resource allocation modes, i.e. mode 3 and mode 4, may by defined for NR V2X sidelink communication. In mode 3, a base station schedules one or more sidelink resources used by a UE for sidelink transmission. In mode 4, a UE determines one or more resources within one or more sidelink resources configured by a base station or one or more pre-configured sidelink resources.

Mode 4 may cover the following resource assignment sub-modes. That is, UE may automatically select a sidelink resource for transmission, help to select a sidelink resource for other UE(s), be configured with grant configured for sidelink transmission, or schedule the sidelink transmission of other UE(s).

V2X Resource Pool (Sensing and Selection Windows)

A V2X UE may transmit a message (or a channel) over a pre-defined (or signaled) resource pool. The resource pool may mean a set of one or more resources pre-defined for enabling the UE to perform the V2X operation (or in the UE capable of performing the V2X operation). In this case, the resource pool may be defined in terms of time-frequency. The V2X transmission resource pool may be defined as various types.

Figure 11A:
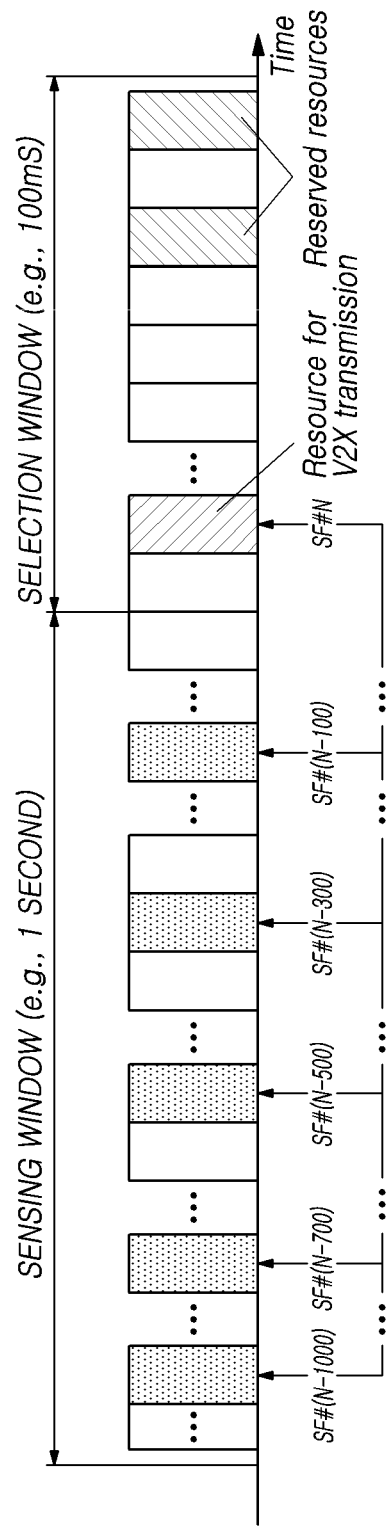
FIGS. 11A and 11B illustrate a type of a V2X transmission resource pool.
Figure 11B:
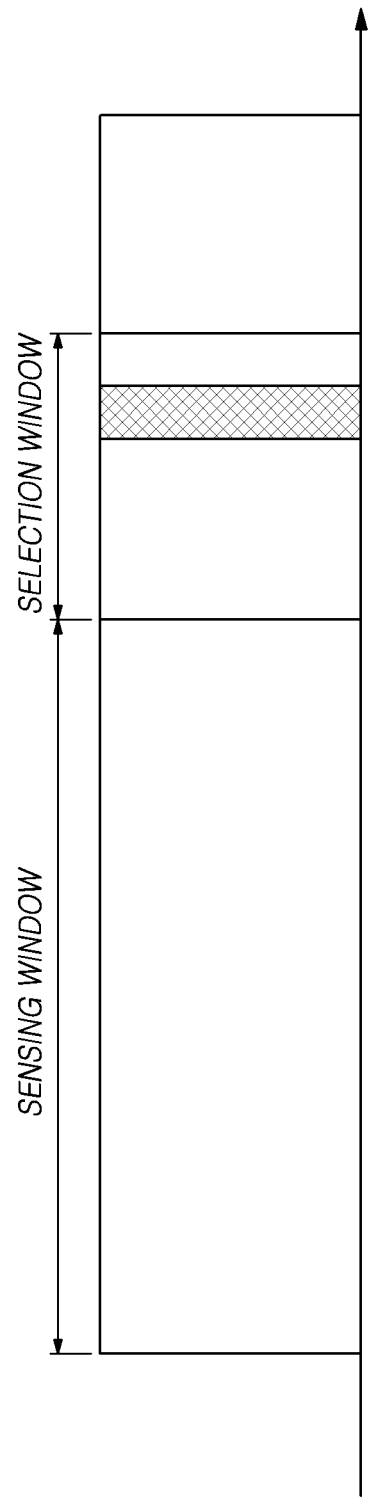

FIGS. 11A and 11B illustrate a type of a V2X transmission resource pool.

Referring to FIG. 11A, V2X transmission resource pool #A may be a resource pool over that allows partial sensing only. A V2X transmission resource selected by the partial sensing is remained semi-statically at a regular interval.

Referring to FIG. 11B, V2X transmission resource pool #A may be a resource pool allowing a random selection only. In V2X transmit resource pool #B, a UE does not perform partial sensing, and the UE may randomly select a V2X transmission resource in a selection window.

For example, unlike a resource pool over allowing partial sensing only, in a resource pool allowing the random selection only, a selected resource may be configured/signaled not to be semi-statically reserved. In order for a UE to perform a V2X message transmission operation over a V2X transmission resource pool, a base station may cause the UE not to perform a sensing operation (based on scheduling assignment decoding/energy measurement).

Although not illustrated in FIGS. 11A and 11B, a resource pool over allowing both the partial sensing and the random selection may be used as well. A base station may notify a UE that a V2X resource may be selected by either of the partial sensing and the random selection.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined. Thus the scheduling for the latency critical data, such as the URLLC, may be performed based on the mini-slot.

Figure 12:
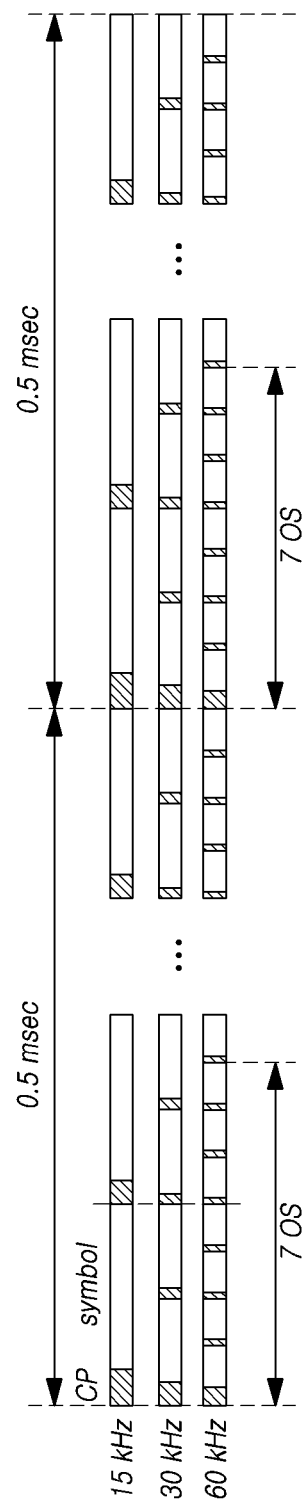
FIG. 12 illustrates an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 12, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

<Bandwidth Part; BWP>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 13:
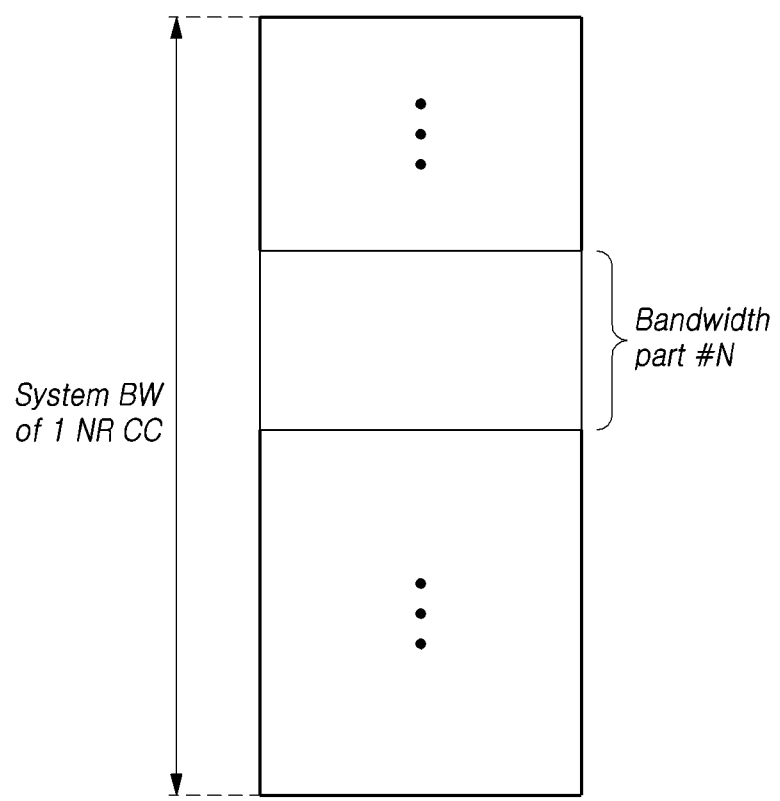
FIG. 13 schematically illustrates a bandwidth part.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 13, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

LTE Sidelink

In the LTE system, for providing device-to-device direct communication and a vehicle-to-everything (V2X) (in particular, vehicle-to-vehicle (V2V)) service, designs have been developed for a radio channel and a radio protocol for transmission/reception of the sidelink which is direct link between UEs. With respect to the sidelink, the PSSS/SSSS and a physical sidelink broadcasting channel (PSBCH) are defined. The PSSS/SSS is a signal for synchronizing between a radio sidelink transmission end and a radio sidelink reception end. The physical sidelink broadcasting channel (PSBCH) is a broadcasting channel for transmitting/receiving a sidelink master information block (MIB) related to this. Further, many studies have been conducted to develop a physical sidelink discovery channel (PSDCH) for transmitting/receiving discovery information, a physical sidelink control channel (PSCCH) for transmitting/receiving sidelink control information (SCI), and a physical sidelink shared channel (PSSCH) for transmitting/receiving sidelink data.

A Method of Assigning a HARQ ACK/NACK Feedback Resource

According to a PUCCH resource assignment method for HARQ ACK/NACK feedback of a UE, which is defined in the NR, a base station configures a PUCCH resource set including one or more PUCCH resources for a UE and indicates (e.g., inform) PUCCH resource information to be used for HARQ ACK/NACK feedback in response to a PDSCH transmission using an ACK resource indicator (ARI) information area of the DCI. In this case, the PUCCH resource set is configured for each UL BWP configured for a corresponding UE, and separate PUCCH resource set(s) may be configured depending on a payload size of HARQ ACK/NACK for a UL BWP.

Hereinafter, a method of transmitting sidelink HARQ feedback information is specifically described with reference to drawings.

Herein, the term "receiver UE (Rx UE)" means a UE receiving a PSCCH and a PSSCH corresponding to the PSCCH based on sidelink communication. The term "transmitter UE (Tx UE)" herein means a UE transmitting a PSCCH and a PSSCH corresponding to the PSCCH based on sidelink communication.

Figure 14:
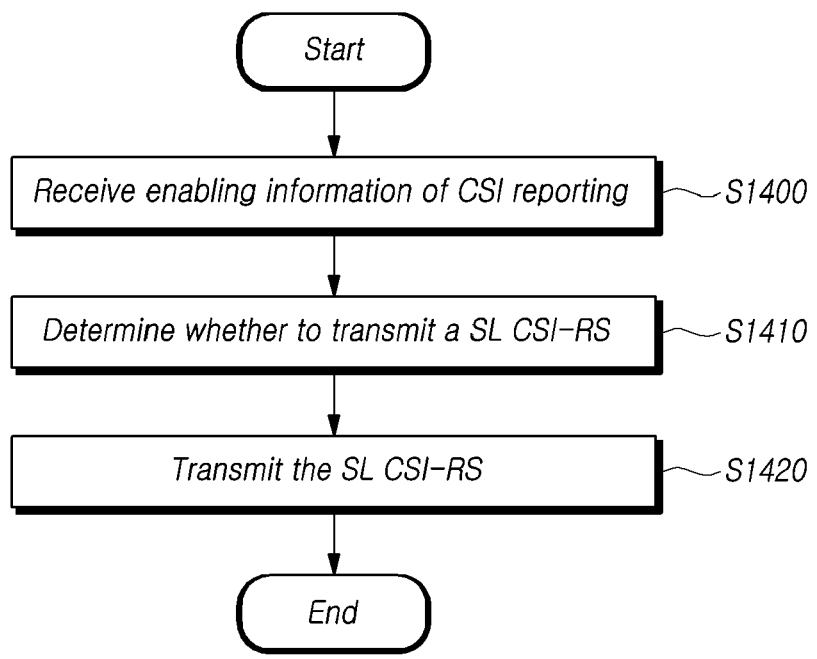
FIG. 14 is a flow diagram illustrating a procedure of a transmitter user equipment (Tx UE) for transmitting a sidelink channel state information reference signal (SL CSI-RS) to a receiver user equipment (Rx UE) in accordance with embodiments of the present disclosure.

FIG. 14 is a flow diagram illustrating a procedure of a transmitter UE for transmitting a sidelink channel state information reference signal ("SL CSI-RS") to a receiver UE in accordance with embodiments of the present disclosure.

Referring to FIG. 14, the transmitter UE may receive enabling information of sidelink channel state information ("CSI") reporting, at step S1400.

In order to acquire sidelink channel state information between the transmitter UE and a receiver UE, the transmitter UE may transmit the SL CSI-RS to the receiver UE. The receiver UE may calculate channel state information based on the received SL CSI-RS and perform CSI reporting through a physical sidelink feedback channel (PSFCH) or a PSSCH.

Accordingly, for sidelink CSI acquisition, it is necessary for the CSI reporting to be enabled for the receiver UE. In one embodiment, the CSI reporting may enabled by a higher layer parameter. The transmitter UE may receive information on whether the CSI reporting is enabled through higher layer signaling.

Referring back to FIG. 14, the transmitter UE may determine whether to transmit the SL CSI-RS based on the enabling information of the CSI reporting, at step S1410.

In one embodiment, when the CSI reporting is enabled, the transmitter UE may transmit the SL CSI-RS to the receiver UE. The transmitter UE may determine whether to transmit the SL CSI-RS to the receiver UE for which CSI reporting has been enabled, and the transmitter UE may transmit information on whether the SL CSI-RS is to be transmitted to the receiver UE through a sidelink control information format ("SCI format").

In one embodiment, when a PSSCH is transmitted, whether a SL CSI-RS is to be transmitted may be dynamically indicated as well. That is, when a PSSCH is transmitted for a receiver UE, it is possible to define an information region for indicating whether a CSI-RS is to be transmitted through a DCI format or a SCI format for transmitting corresponding PSSCH assignment information, and, based on this, indicate whether the corresponding PSSCH transmission includes the CSI-RS transmission.

That is, the transmitter UE may set a value in an information region included in the SCI format, such as a CSI request field, according to determination on whether to transmit the SL CSI-RS. The receiver UE may receive the SL CSI-RS according to the value of the CSI request field included in the received SCI format.

Referring back to FIG. 14, the transmitter UE may transmit the SL CSI-RS to the receiver UE within a resource assigned for physical sidelink shared channel (PSSCH) transmission, at step S1420.

When the transmitter UE determines to transmit the SL CSI-RS, the transmitter UE may transmit the SL CSI-RS to the receiver UE, within a resource assigned for the PSSCH transmission. To do this, the SL CSI-RS that can be used for channel state information acquisition may be configured by a base station, the transmitter UE, or a scheduling UE, and configuration information on the SL CSI-RS may be transmitted to the receiver UE.

In one embodiment, in order to transmit the SL CSI-RS, a first symbol within a resource block that is used to transmit the SL CSI-RS and frequency resource allocation information may be configured through a higher layer parameter. The transmitter UE may transmit the SL CSI-RS to the receiver UE based on the first symbol within the resource block that is used to transmit the SL CSI-RS and the frequency resource allocation information, which are configured by higher layer signaling, within a resource assigned for PSSCH transmission for the receiver UE.

The receiver UE may receive the SL CSI-RS, acquire channel state information based on the received SL CSI-RS, and perform CSI reporting through a PSFCH. To do this, in one embodiment, PSFCH resource allocation information may be dynamically indicated by the base station, the transmitter UE, or the scheduling UE through DCI or SCI including resource allocation information on a PSSCH transmitted over a PDCCH or a PSCCH.

For example, a PSFCH resource indication information region for allowing the receiver UE to perform CSI reporting may be included in the DCI format or the SCI format. Through this, a PSFCH resource may be determined for the CSI reporting of the receiver UE.

When the receiver UE performs the CSI reporting through the determined PSFCH resource, CSI acquisition may be performed in the transmitter UE.

In another embodiment, the receiver UE may receive the SL CSI-RS, acquire channel state information based on the received SL CSI-RS, configure a higher layer message for CSI reporting, and then transmit this to the transmitter UE through a PSSCH.

In accordance with the embodiments of the present disclosure, methods and apparatuses are provided for transmitting and/or receiving a reference signal between a transmitter UE and a receiver UE in order to acquire channel state information for sidelink transmission, in the NR.

Figure 15:
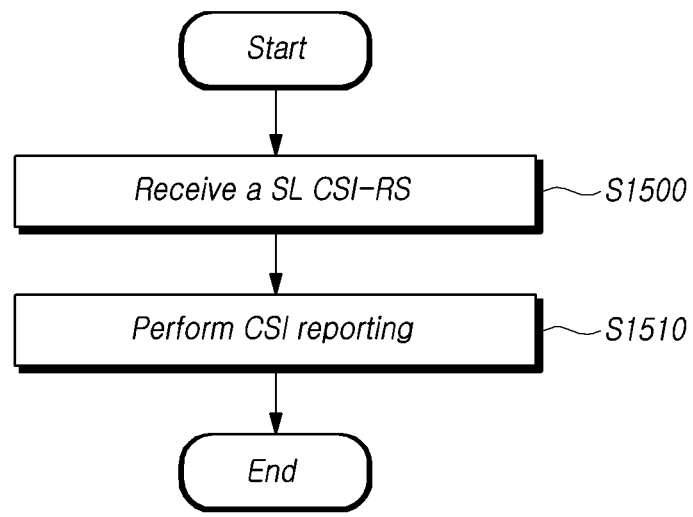
FIG. 15 is a flow diagram illustrating a procedure of a receiver user equipment (Rx UE) for receiving a SL CSI-RS from a Tx UE in accordance with embodiments of the present disclosure.

FIG. 15 is a flow diagram illustrating a procedure of a receiver UE for receiving a SL CSI-RS from a transmitter UE in accordance with embodiments of the present disclosure.

Referring to FIG. 15, the receiver UE may receive, from a transmitter UE, a SL CSI-RS, which has been determined to be transmitted based on enabling information of CSI reporting, within a resource assigned for PSSCH transmission, at step S1500.

In order to acquire sidelink channel state information between the transmitter UE and the receiver UE, the receiver UE may receive the SL CSI-RS from the transmitter UE. The receiver UE may calculate channel state information based on the received SL CSI-RS and perform CSI reporting through a PSFCH or a PSSCH.

Accordingly, for sidelink CSI acquisition, it is necessary for the CSI reporting to be enabled for the receiver UE. In one embodiment, the CSI reporting may enabled by a higher layer parameter. The transmitter UE may receive information on whether the CSI reporting is enabled through higher layer signaling.

The transmitter UE may determine whether to transmit the SL CSI-RS based on the enabling information of the CSI reporting. In one embodiment, when the CSI reporting is enabled, the transmitter UE may transmit the SL CSI-RS to the receiver UE. In case the transmitter UE determines whether to transmit the SL CSI-RS to the receiver UE for which CSI reporting has been enabled, the receiver UE may receive, through a SCI format, information on whether the SL CSI-RS is to be transmitted, from the transmitter UE.

In one embodiment, when a PSSCH is transmitted, whether a SL CSI-RS is to be transmitted may be dynamically indicated as well. That is, when a PSSCH is transmitted for a receiver UE, it is possible to define an information region for indicating whether a CSI-RS is to be transmitted through a DCI format or a SCI format for transmitting corresponding PSSCH assignment information, and, based on this, indicate whether the corresponding PSSCH transmission includes the CSI-RS transmission.

That is, the transmitter UE may set a value in an information region included in the SCI format, such as a CSI request field, according to determination on whether to transmit the SL CSI-RS. The receiver UE may receive the SL CSI-RS according to the value of the CSI request field included in the received SCI format.

The receiver UE may receive the SL CSI-RS from the transmitter UE within a resource assigned for physical sidelink shared channel (PSSCH) reception. When the transmitter UE determines to transmit the SL CSI-RS, the receiver UE may receive the SL CSI-RS from the transmitter UE within the resource assigned for the PSSCH transmission. To do this, the SL CSI-RS that can be used for channel state information acquisition may be configured by a base station, the transmitter UE, or a scheduling UE, and configuration information on the SL CSI-RS may be received in the receiver UE.

In one embodiment, in order to transmit the SL CSI-RS, a first symbol within a resource block that is used to transmit the SL CSI-RS and frequency resource allocation information may be configured through a higher layer parameter. The receiver UE may receive the SL CSI-RS from the transmitter UE based on the first symbol within the resource block that is used to transmit the SL CSI-RS and the frequency resource allocation information, which are configured by higher layer signaling, within a resource assigned for PSSCH reception for the receiver UE.

Referring back to FIG. 15, the receiver UE may perform CSI reporting based on the received SL CSI-RS, at step S1510.

The receiver UE may receive the SL CSI-RS, acquire channel state information based on the received SL CSI-RS, and perform CSI reporting through a PSFCH. To do this, in one embodiment, PSFCH resource allocation information may be dynamically indicated by the base station, the transmitter UE, or the scheduling UE through DCI or SCI including resource allocation information on a PSSCH transmitted through a PDCCH or a PSCCH.

For example, a PSFCH resource indication information region for allowing the receiver UE to perform CSI reporting may be included in the DCI format or the SCI format. Through this, a PSFCH resource may be determined for the CSI reporting of the receiver UE.

When the receiver UE performs the CSI reporting through the determined PSFCH resource, CSI acquisition may be performed in the transmitter UE.

In another embodiment, the receiver UE may perform the CSI reporting through a higher layer message. In this case, the transmitter UE may acquire corresponding CSI information through a PSSCH transmitted from the receiver UE.

In accordance with the embodiments of the present disclosure, methods and apparatuses are provided for transmitting and/or receiving a reference signal between a transmitter UE and a receiver UE in order to acquire channel state information for sidelink transmission, in the NR.

Hereinafter, embodiments related to reference signal transmission and/or reception for acquiring channel state information at the time of sidelink transmission in the NR will be described with reference to the accompanying drawings.

Radio resource assignment for V2X data transmission and/or reception through LTE-based sidelink can be performed in a distributed manner or in a centralized manner. That is, within one or more resource pools configured by a base station or pre-configured, a transmitter UE (a transmitting node) may select a radio resource, for example, a sub-channel, for sidelink data transmission, and transmit a PSSCH and a PSCCH including scheduling control information on the PSSCH over the selected radio resource. In another embodiment, a base station may transmit sidelink resource allocation information for a transmitter UE to the transmitter UE through a PDCCH, and the transmitter UE may transmit the corresponding PSCCH and PSSCH using the sidelink resource assigned by the base station. Like this, as a method of transmitting radio data through the sidelink, defined is transmission mode 3 scheduled by a base station or distributed-based transmission mode 4.

Likewise, for NR-based V2X, defined are mode 1 in which scheduling for a sidelink transmission resource is assigned by a base station (gNB) and mode 2 in which it is assigned by a scheduling UE. Embodiments and description provided in the present disclosure may be applicable in any of the mode 1 and the mode 2 without departing from the spirit and the scope of the present disclosure. Further, sidelink transmission and/or reception based on the unicast or the groupcast, as well as the broadcast, may be supported for the NR-based V2X.

In order for a base station to acquire DL channel state information (CSI) for a UE, in the LTE and the NR, a CSI acquisition method is defined for allowing the base station to transmit a channel state information reference signal (CSI-RS) over a DL slot, and, based on this, the UE to transmit CSI reporting information to the base station. To do this, the base station may transmit CSI-RS transmission resource configuration information for a UE to each UE through UE-specific higher layer signaling. According to this, the UE may receive the CSI-RS from the base station, calculate CSI based on this, and report the calculated CSI to the base station through a PUCCH or a PUSCH. The base station may configure/indicate periodic, semi-persistent, or aperiodic CSI reporting of the UE.

Likewise, when sidelink unicast or groupcast is supported, a transmitter UE (Tx UE) may acquire CSI for sidelink with a receiver UE (Rx UE), and, based on this, apply link adaptation for a PSCCH or PSSCH transmission. To do this, a reference signal for CSI calculation is needed to be transmitted from the transmitter UE to receiver UE, and a series of processes is needed for allowing the receiver UE to acquire CSI based on this and to feed back it to the transmitter UE.

In accordance with embodiments of the present disclosure, like this, provided are control information configuration and transmission methods for enabling a transmitter UE to transmit a reference signal for CSI acquisition in the sidelink, and CSI reporting methods of a receiver UE based on this.

Embodiment 1 Reference Signal Configuration for CSI Acquisition

A CSI-RS has been separately defined as a reference signal for CSI acquisition for DL of a Uu interface between a base station and a UE.

Likewise, a SL CSI-RS may be defined for CSI acquisition for the sidelink. Based on the SL CSI-RS, acquiring CSI on the sidelink may be defined. In another embodiment, without defining a separate sidelink CSI-RS, one or more other sidelink RS(s) may be used for CSI acquisition. For example, when PSSCH transmission is performed, a DM-RS for the demodulation of the PSSCH, a phase tracking reference signal (PT-RS) for modifying phase noise, a tracking reference signal (TRS), or the like may be utilized as a usage for CSI acquisition.

Like this, in case one or more reference signals may be used for sidelink CSI acquisition, for a sidelink UE, a reference signal to be used for CSI acquisition in the sidelink UE may be configured or indicated. For example, a base station, a transmitter UE, or a scheduling UE may transmit, to a receiver UE, reference signal configuration information to be used for sidelink CSI acquisition in conjunction with the transmitter UE at the receiver UE through higher layer signaling.

For example, in case a sidelink CSI-RS is defined, the base station, the transmitter UE, or the scheduling UE may configure a reference signal that can be used for CSI acquisition in a corresponding UE among all reference signals that can be included when a sidelink PSSCH is transmitted, such as a CSI-RS, a DM-RS, a PT-RS, or the like, and transmit the configured reference signal to the receiver UE. In this case, the corresponding information may be transmitted over a PDSCH or a PSSCH through UE-specific or cell-specific/UE-group common higher layer signaling, or indicated through a PDSCH or a PSSCH in the form of L1 control signaling. The receiver UE may be able to acquire reference signal information to be used for sidelink CSI acquisition through reference signal configuration information for the corresponding sidelink CSI acquisition. In this case, one reference signal or one or more reference signals may be configured for a receiver UE as a reference signal for the sidelink CSI acquisition.

Embodiment 2 Sidelink CSI-RS Configuration

In case a separate sidelink CSI-RS is defined, it is necessary to define a method for transmitting time-domain and frequency-domain resource assignment and corresponding assignment information for corresponding CSI-RS transmission to a receiver UE.

As one method for this, CSI-RS transmission for a receiver UE may be limited to be performed over a PSSCH transmission resource assigned for the receiver UE.

In this case, as a time-domain resource assignment method of a CSI-RS for the receiver UE, a time-domain resource of the CSI-RS may be fixed as a last symbol or last N symbols of an assigned PSSCH. In the case of the lase N symbols, the corresponding N value may be set through higher layer signaling. In another embodiment, a corresponding CSI-RS transmission symbol may be determined by a duration of the PSSCH assigned for the receiver UE to receive through the sidelink, that is, the number of symbols.

Frequency-domain resource assignment for CSI-RS transmission, that is, sub-carrier assignment, may be determined on a per PRB basis. That is, one or more sub-carrier index(s) to be used for CSI-RS transmission may be determined within a one PRB, and one or more identical sub-carrier index(s) within respective PRBs for all PRBs assigned for PSSCH transmission may be used for the CSI-RS transmission. At this time, the corresponding sub-carrier index(s) may be semi-statically configured by a base station, a transmitter UE, or a scheduling UE and then transmitted by higher layer signaling. In another embodiment, the corresponding sub-carrier index(s) may be dynamically indicated through a PDCCH or a PSCCH, or determined as a function of a base station, a transmitter UE, a cell ID, or the like.

In further another embodiment, frequency-domain resource assignment for the CSI-RS transmission, that is, subcarrier assignment, may be depend on the number of PRBs assigned for PSSCH transmission. Specifically, the density of CSI-RS transmission resources in the frequency axis, that is, the number of subcarriers used as a CSI-RS when replaced with one PRB, may differ depending on the number of PRBs.

In another embodiment, a plurality of time-domain/frequency-domain CSI-RS assignment patterns may be defined, or a base station, a transmitter UE, or a scheduling UE may configure a plurality of time-domain/frequency-domain CSI-RS assignment patterns through higher layer signaling and then indicate CSI-RS assignment pattern information to be used when a PSSCH transmission resource is assigned, through a corresponding DCI format or SCI format.

Additionally, when a PSSCH is transmitted, whether a CSI-RS is transmitted may be dynamically indicated. That is, when a PSSCH is transmitted for a receiver UE, it is possible to define an information region for indicating whether a CSI-RS is to be transmitted through a DCI format or a SCI format for transmitting corresponding PSSCH assignment information, and, based on this, indicate whether the corresponding PSSCH transmission includes the CSI-RS transmission.

Embodiment 3 PSFCH Resource Configuration Method for CSI Reporting

A PSFCH has been defined for sidelink control information feedback of a receiver UE. Sidelink control information feedback information may be HARQ ACK/NACK feedback information and CSI reporting information in response to PSSCH reception. In accordance with embodiments of the present disclosure, provided are a CSI reporting method of a receiver UE and a PSFCH resource assignment method for this.

In case CSI reporting is enabled, a receiver UE may report CSI through a PSFCH as a response of the receiver UE for PSSCH reception. Specifically, a receiver UE may report CSI in response to all PSSCH reception. For example, the receiver UE may report CSI in response to N PSSCH receptions. In this case, the N value may be set through higher layer signaling from a base station, a transmitter UE, or a scheduling UE. In another embodiment, an information region for a CSI reporting indication may be defined through a DCI format or a SCI format through which PSSCH assignment information is transmitted, and through this, whether CSI reporting is performed for a receiver UE may be dynamically indicated.

Additionally, a CSI reporting method for a receiver UE may be configured through higher layer signaling from a base station, a transmitter UE, or a scheduling UE, and based on this, one of the above CSI reporting methods may be applied.

Hereinafter, provided is a PSFCH resource assignment method for CSI reporting. As an method for this, corresponding PSFCH resource allocation information may be dynamically indicated by the base station, the transmitter UE, or the scheduling UE through DCI or SCI including resource allocation information on a PSSCH transmitted over a PDCCH or a PSCCH. Specifically, for a receiver UE for which CSI reporting is enabled, a PSFCH resource indication information region for CSI reporting of the receiver UE may be included in a DCI format or a SCI format for transmitting PSSCH scheduling control information on the receiver UE. Through this, a PSFCH resource may be determined for the CSI reporting of the receiver UE.

In this case, a PSFCH resource pool (or, a PSFCH resource set) for corresponding PSFCH resource indication may be configured through higher layer signaling by a base station, a transmitter UE, or a scheduling UE, or an associated PSFCH resource pool or an associated PSFCH resource set for a PSSCH may be configured. At this time, corresponding associated PSFCH, associated PSFCH resource pool or associated PSFCH resource set configuration information may include information on a timing gap from a slot over which corresponding PSSCH transmission is performed or a slot over which a PSSCH resource pool over which the corresponding PSSCH transmission is performed is performed, time resource allocation information for configuring the PSFCH resource pool or the PSFCH resource set, PSFCH sub-channel ID assignment information, or the like. Here, the time resource allocation information for configuring the PSFCH resource pool or the PSFCH resource set may be, for example, symbol assignment information. Further, frequency resource and sequence assignment information of the PSFCH resource pool or the PSFCH resource set may be i) PRB resource allocation information and sequence assignment information of the associated PSFCH resource pool or PSFCH resource set or ii) PRB resource allocation information and sequence assignment information of each PSFCH configuring the associated PSFCH resource pool or PSFCH resource set.

Based on this, a PSFCH resource indication for CSI reporting, for example, a PSFCH resource index indication or a PSFCH sub-channel ID indication, may be performed through the DCI format or the SCI format.

In another embodiment, as further another method for a PSFCH resource indication, an implicit indication may be performed. For example, a PSFCH resource indication based on the associated PSFCH resource pool or the associated PSFCH resource set may be defined as a function of a radio resource (e.g., a lowest VRB, PRB index or slot index, or a lowest PSSCH sub-channel ID, etc.) over which PSCCH transmission is performed for a receiver UE.

In this case, when the dynamic PSFCH resource assignment is performed, timing gap information between a PSSCH reception slot and a PSFCH transmission slot according to this may be dynamically indicated through a DCI format or a SCI format or fixed as a pre-configured value, without being included in associated PSFCH resource pool or PSFCH resource set configuration information through higher layer signaling.

As another method, a PSFCH resource for corresponding CSI reporting may be semi-statically assigned through higher layer signaling. In this case, a higher layer parameter for corresponding PSFCH resource assignment may include timing gap information between a PSSCH reception slot and a slot for performing PSFCH resource assignment for CSI reporting, which corresponds to the PSSCH reception slot, PSFCH sub-channel ID or PRB and sequence resource allocation information, or the like.

Additionally, in a receiver UE, when both HARQ ACK/NACK feedback and CSI reporting are enabled in response to PSSCH reception, the receiver UE may multiplex and transmit corresponding HARQ ACK/NACK information and CSI reporting information through one PSFCH transmission. In this case, a separate PSFCH resource configuration/indication for the CSI reporting may not be performed, corresponding multiplexed UCI (HARQ ACK/NACK+CSI reporting) may be transmitted according to PSFCH resource configuration information for the HARQ ACK/NACK feedback, that is, higher layer configuration information for configuring the associate PSFCH resource pool or PSFCH resource set, or the like, or indication information, that is, the PSFCH resource indication information or implicit indication information. That is, according to a PSFCH resource mapping rule for the HARQ ACK/NACK feedback, PSFCH resource assignment may be performed for the multiplexed sidelink feedback information transmission.

In another embodiment, in even this case, a PSFCH for the CSI reporting may be transmitted apart from a PSFCH for HARQ ACK/NACK feedback. For example, when HARQ ACK/NACK feedback and CSI reporting in response to a PSSCH reception may be configured or indicated to be performed through different slots from each other, a corresponding UE may transmit the HARQ ACK/NACK feedback and the CSI reporting through respective separate PSFCHs, and only when corresponding sidelink feedback information transmission is configured or indicated to be performed through a single slot, CSI reporting information may also be multiplexed and transmitted through a PSFCH assigned for the HARQ ACK/NACK feedback. In another embodiment, on the contrary, corresponding HARQ ACK/

NACK information and CSI reporting information may be multiplexed and transmitted through a PSFCH assigned for the CSI reporting.

In further another embodiment, irrespective of a sidelink feedback information type, an associated PSFCH in response to a PSSCH reception may be defined, and a receiver UE may multiplex and transmit all feedback information defined to be transmitted in response to the corresponding PSSCH reception through the corresponding associated PSFCH. That is, a common PSFCH resource assignment rule for both HARQ ACK/NACK feedback information and CSI reporting may be defined, and one or more higher layer parameter(s) for this or indication information through L1 control signaling may be also defined commonly.

For example, configuration information on an associated PSFCH, an associated PSFCH resource pool or an associated PSFCH resource set corresponding to a PSSCH resource pool over which a PSSCH transmission or a corresponding PSSCH transmission is performed may be defined to be transmitted from a base station, a transmitter UE, or a scheduling UE to a receiver UE through higher layer signaling. At this time, configuration information on the corresponding associated PSFCH, the associated PSFCH resource pool or the associated PSFCH resource set may include information on a timing gap from a PSSCH resource pool over which corresponding PSSCH transmission or corresponding PSSCH transmission is performed, time resource allocation information of the PSFCH resource pool or the PSFCH resource set, PSFCH frequency resource and sequence assignment information, or the like.

Here, the time resource allocation information of the PSFCH resource pool or the PSFCH resource set may be, for example, symbol assignment information. Further, the frequency resource and sequence assignment information may be i) PRB resource allocation information and sequence assignment information of the associated PSFCH resource pool or PSFCH resource set or ii) PRB resource allocation information and sequence assignment information of each PSFCH configuring the associated PSFCH resource pool or PSFCH resource set.

Further, a PSFCH resource for sidelink feedback information (i.e. HARQ ACK/NACK, CSI reporting, or HARQ ACK/NACK+CSI reporting) transmission corresponding to a PSSCH within the associated PSFCH resource pool or the PSFCH resource set may be dynamically indicated (PSFCH resource index indication or PSFCH sub-channel ID indication) through a DCI format or a SCI format, or implicitly indicated. As a type of the implicit indication method, corresponding PSFCH resource assignment (PRB+sequence assignment or PSFCH sub-channel ID assignment) may be defined to be performed as a function of an ID of a lowest sub-channel or a lowest PRB etc. over which the PSCCH or PSSCH transmission is performed.

In accordance with the embodiments of the present disclosure, methods and apparatuses are provided for transmitting and/or receiving a reference signal between a transmitter UE and a receiver UE in order to acquire channel state information for sidelink transmission, in the NR.

Hereinafter, configurations of a receiver UE and a transmitter UE capable of performing a part or all of the embodiments described with reference to FIGS. 1 to 15 will be discussed with reference to the drawings.

Figure 16:
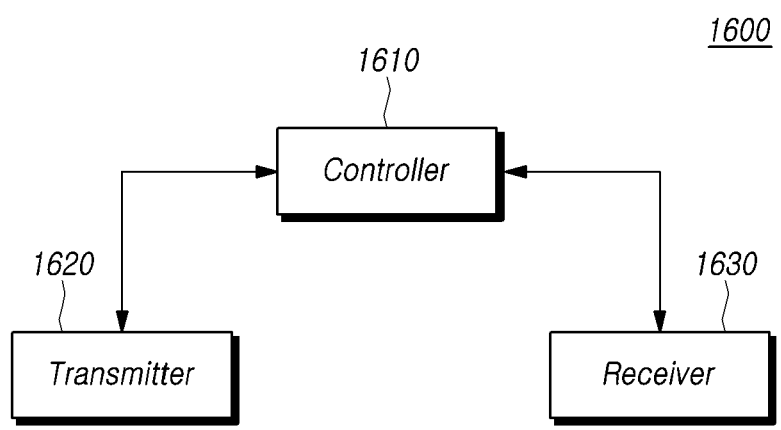
FIG. 16 is a block diagram illustrating a Tx UE according to embodiments of the present disclosure.

FIG. 16 is a block diagram illustrating a transmitter UE 1600 according to embodiments of the present disclosure.

Referring to FIG. 16, the transmitter UE 1600 includes a controller 1610, a transmitter 1620, and a receiver 1630.

The controller 1610 controls overall operations of the transmitter UE 1600 according to methods for allowing the transmitter UE to transmit a reference signal for sidelink channel state information acquisition, needed to perform the embodiments of the present disclosure described above. The transmitter 1620 transmits UL control information, data, and messages etc. to a base station over a corresponding channel, and transmits sidelink control information, data, and messages etc. to a receiver UE over a corresponding channel. The receiver 1630 receives DL control information, data, and messages etc. from the base station over a corresponding channel, and receives sidelink control information, data, and messages etc. from the receiver UE over a corresponding channel.

In order to acquire sidelink channel state information between the transmitter UE and the receiver UE, the transmitter 1620 may transmit a SL CSI-RS to the receiver UE. The receiver UE may calculate channel state information based on the received SL CSI-RS and perform CSI reporting through a PSFCH.

Accordingly, for sidelink CSI acquisition, it is necessary for the CSI reporting to be enabled for the receiver UE. In one embodiment, the CSI reporting may enabled by a higher layer parameter. The receiver 1620 may receive information on whether the CSI reporting is enabled through higher layer signaling.

The controller 1610 may determine whether to transmit the SL CSI-RS based on the enabling information of the CSI reporting. In one embodiment, when the CSI reporting is enabled, the transmitter UE may transmit the SL CSI-RS to the receiver UE. The controller 1610 may determine whether to transmit the SL CSI-RS to the receiver UE for which CSI reporting has been enabled. The transmitter 1620 may transmit information on whether the SL CSI-RS is transmitted to the receiver UE through a SCI format.

In one embodiment, when a PSSCH is transmitted, whether a SL CSI-RS is to be transmitted may be dynamically indicated as well. That is, when a PSSCH is transmitted for a receiver UE, it is possible to define an information region for indicating whether a CSI-RS is to be transmitted through a DCI format or a SCI format for transmitting corresponding PSSCH assignment information, and, based on this, indicate whether the corresponding PSSCH transmission includes the CSI-RS transmission.

That is, the controller 1610 may set a value in an information region included in the SCI format, such as a CSI request field, according to determination on whether to transmit the SL CSI-RS. The receiver UE may receive the SL CSI-RS according to the value of the CSI request field included in the received SCI format.

The transmitter 1620 may transmit the SL CSI-RS to the receiver UE within a resource assigned for PSSCH transmission. When the controller 1610 determines to transmit the SL CSI-RS, the transmitter 1620 can transmit the SL CSI-RS to the receiver UE within the resource assigned for the PSSCH transmission. To do this, the SL CSI-RS that can be used for channel state information acquisition may be configured by a base station, the transmitter UE, or a scheduling UE, and configuration information on the SL CSI-RS may be transmitted to the receiver UE.

In one embodiment, in order to transmit the SL CSI-RS, a first symbol within a resource block that is used to transmit the SL CSI-RS and frequency resource allocation information may be configured through a higher layer parameter. The transmitter 1620 may transmit the SL CSI-RS to the receiver UE based on the first symbol within the resource block that is used to transmit the SL CSI-RS and the frequency resource allocation information, which are configured by higher layer signaling, within a resource assigned for PSSCH transmission for the receiver UE.

The receiver UE may receive the SL CSI-RS, acquire channel state information based on the received SL CSI-RS, and perform CSI reporting over a PSFCH. To do this, in one embodiment, PSFCH resource allocation information may be dynamically indicated by the base station, the transmitter UE, or the scheduling UE through DCI or SCI including resource allocation information on a PSSCH transmitted over a PDCCH or a PSCCH. For example, a PSFCH resource indication information region for allowing the receiver UE to perform CSI reporting may be included in the DCI format or the SCI format. Through this, a PSFCH resource may be determined for the CSI reporting of the receiver UE.

When the receiver UE performs the CSI reporting through the determined PSFCH resource, the receiver 1630 may perform CSI acquisition.

In another embodiment, when the CSI reporting is performed through a higher layer message, the receiver UE may transmit a PSSCH to the transmitter UE for the CSI reporting, and the receiver 1630 may perform the CSI acquisition through the PSSCH.

In accordance with the embodiments of the present disclosure, methods and apparatuses are provided for transmitting and/or receiving a reference signal between a transmitter UE and a receiver UE in order to acquire channel state information for sidelink transmission, in the NR.

Figure 17:
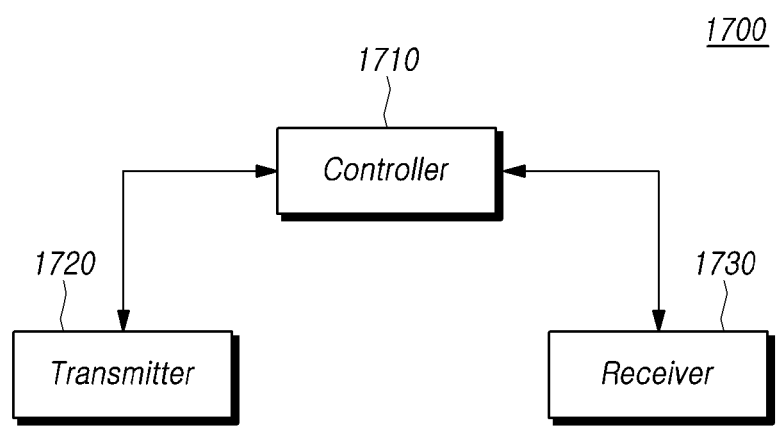
FIG. 17 is a block diagram illustrating a Rx UE according to embodiments of the present disclosure.

FIG. 17 is a block diagram illustrating a receiver UE 1700 according to embodiments of the present disclosure.

Referring to FIG. 17, the receiver UE 1700 includes a controller 1710, a transmitter 1720, and a receiver 1730.

The controller 1710 controls overall operations of the receiver UE 1700 according to methods for allowing the receiver UE to receive a reference signal for sidelink channel state information acquisition, needed to perform the embodiments of the present disclosure described above. The transmitter 1720 is used to transmit signals, messages, and data needed for carrying out the embodiments described above to a UE. The receiver 1730 is used to receive signals, messages, and data needed for carrying out the embodiments described above from a UE.

The receiver 1730 may receive, from a transmitter UE, a SL CSI-RS, which has been determined to be transmitted based on enabling information of CSI reporting, within a resource assigned for PSSCH transmission.

In order to acquire sidelink channel state information between the transmitter UE and the receiver UE, the receiver 1730 may receive a SL CSI-RS from the transmitter UE. The receiver UE may calculate channel state information based on the received SL CSI-RS and perform CSI reporting through a PSFCH.

Accordingly, for sidelink CSI acquisition, it is necessary for the CSI reporting to be enabled for the receiver UE. In one embodiment, the CSI reporting may enabled by a higher layer parameter. The transmitter UE may receive information on whether the CSI reporting is enabled through higher layer signaling.

The transmitter UE may determine whether to transmit the SL CSI-RS based on the enabling information of the CSI reporting. In one embodiment, when the CSI reporting is enabled, the transmitter UE may transmit the SL CSI-RS to the receiver UE. In case the transmitter UE determines whether to transmit the SL CSI-RS to the receiver UE for which CSI reporting has been enabled, the receiver 1730 may receive, through a SCI format, information on whether the SL CSI-RS is to be transmitted from the transmitting.

In one embodiment, when a PSSCH is transmitted, whether a SL CSI-RS is to be transmitted may be dynamically indicated as well. That is, when a PSSCH is transmitted for a receiver UE, it is possible to define an information region for indicating whether a CSI-RS is to be transmitted through a DCI format or a SCI format for transmitting corresponding PSSCH assignment information, and, based on this, indicate whether the corresponding PSSCH transmission includes the CSI-RS transmission.

That is, the transmitter UE may set a value in an information region included in the SCI format, such as a CSI request field, according to determination on whether to transmit the SL CSI-RS. The receiver 1730 may receive the SL CSI-RS according to the value of the CSI request field included in the received SCI format.

The receiver 1730 may receive the SL CSI-RS from the transmitter UE within a resource assigned for PSSCH reception. When the transmitter UE determines to transmit the SL CSI-RS, the receiver UE may receive the SL CSI-RS from the transmitter UE within the resource assigned for the PSSCH transmission. To do this, the SL CSI-RS that can be used for channel state information acquisition may be configured by a base station, the transmitter UE, or a scheduling UE, and configuration information on the SL CSI-RS may be received in the receiver UE 1730.

In one embodiment, in order to transmit the SL CSI-RS, a first symbol within a resource block that is used to transmit the SL CSI-RS and frequency resource allocation information may be configured through a higher layer parameter. The receiver 1730 may receive the SL CSI-RS from the transmitter UE based on the first symbol within the resource block that is used to transmit the SL CSI-RS and the frequency resource allocation information, which are configured by higher layer signaling, within a resource assigned for PSSCH reception for the receiver UE.

The transmitter 1720 may perform CSI reporting based on the received SL CSI-RS. In case the SL CSI-RS is received, the controller 1710 may acquire channel state information based on the received SL CSI-RS. The transmitter 1720 may report the CSI through a PSFCH. To do this, in one embodiment, PSFCH resource allocation information may be dynamically indicated by the base station, the transmitter UE, or the scheduling UE through DCI or SCI including resource allocation information on a PSSCH transmitted over a PDCCH or a PSCCH.

For example, a PSFCH resource indication information region for allowing the receiver UE to perform CSI reporting may be included in the DCI format or the SCI format. Through this, a PSFCH resource may be determined for the CSI reporting of the receiver UE.

When the transmitter 1720 performs the CSI reporting through the determined PSFCH resource, CSI acquisition may be performed in the transmitter UE.

In another embodiment, in case the corresponding CSI reporting is performed through a higher layer message, the receiver UE may transmit a PSSCH to the transmitter UE for the CSI reporting, and when the transmitter 1720 performs CSI reporting through a PSSCH determined from a base station or determined by the controller 1710, CSI acquisition may be performed in the transmitter UE.

In accordance with the embodiments of the present disclosure, methods and apparatuses are provided for transmitting and/or receiving a reference signal between a transmitter UE and a receiver UE in order to acquire channel state information for sidelink transmission, in the NR.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a transmitting equipment for acquiring sidelink channel state information (CSI), the method comprising:

transmitting, to a receiving equipment, information indicating to report the sidelink CSI through a sidelink control information (SCI) format;

transmitting, to the receiving equipment, sidelink CSI reference signal (RS) in association with the information indicating to report the sidelink CSI; and acquiring the sidelink CSI based on sidelink CSI reporting from the receiving equipment, wherein the sidelink CSI RS is transmitted within a resource assigned for a physical sidelink shared channel (PSSCH) transmission, wherein the sidelink CSI RS is transmitted to the receiving equipment only if enabling information of the sidelink CSI reporting is received by the transmitting equipment, wherein the SCI format includes a specific value in a field for the information indicating to report the sidelink CSI, wherein a specific higher layer parameter is used for acquiring the sidelink CSI, wherein the sidelink CSI RS is transmitted based on configuration information by a higher layer signaling, and wherein the configuration information relates to a first parameter indicating a first orthogonal frequency division multiplexing (OFDM) symbol in a physical resource block (PRB used for the sidelink CSI RS and a second parameter indicating a number of antenna ports and a frequency domain allocation for the sidelink CSI RS.

2. The method according to claim 1, wherein the transmitting equipment transmits the CSI RS to the receiving equipment based on the first symbol and the frequency resource allocation information, within the resource assigned for PSSCH transmission.

3. The method according to claim 1, wherein the SCI format includes PSSCH assignment information, and wherein the enabling information of the sidelink CSI reporting is dynamically indicated by setting a value in an information region of the SCI format, the set value indicating to the transmitting receiver whether the sidelink CSI RS is to be transmitted through a PSSCH transmission corresponding to the PSSCH assignment information, the set value indicating to the receiving equipment whether the corresponding PSSCH transmission includes the sidelink CSI RS transmission.

4. A method of a receiving equipment for reporting sidelink channel state information (CSI), the method comprising:

receiving, from a transmitting equipment, information indicating to report the sidelink CSI through a sidelink control information (SCI) format;

receiving, from the transmitting equipment, sidelink CSI reference signal (RS) in association with the information indicating to report the sidelink CSI; and performing sidelink CSI reporting based on the received sidelink CSI RS, wherein the sidelink CSI RS is received within a resource assigned for a physical sidelink shared channel (PSSCH) transmission, wherein the sidelink CSI RS is received by the receiving equipment only if enabling information of the sidelink CSI reporting is received by the transmitting equipment, wherein the SCI format includes a specific value in a field for the information indicating to report the sidelink CSI, wherein a specific higher layer parameter is used for acquiring the sidelink CSI, wherein the sidelink CSI RS is received based on configuration information by a higher layer signaling, and wherein the configuration information relates to a first parameter indicating a first orthogonal frequency division multiplexing (OFDM) symbol in a physical resource block (PRB) used for the sidelink CSI RS and a second parameter indicating a number of antenna ports and a frequency domain allocation for the sidelink CSI RS.

5. The method according to claim 4, wherein the receiving equipment receives the CSI RS from the transmitting equipment based on the first OFDM symbol and the frequency resource allocation, within the resource assigned for PSSCH transmission.

6. The method according to claim 4,
wherein the SCI format includes PSSCH assignment information, and
wherein the enabling information of the sidelink CSI reporting is dynamically indicated by setting a value in an information region of the SCI format, the set value indicating to the transmitting receiver whether the sidelink CSI RS is to be transmitted through a PSSCH transmission corresponding to the PSSCH assignment information, the set value indicating to the receiving equipment whether the corresponding PSSCH transmission includes the sidelink CSI RS transmission.

7. A transmitting equipment for acquiring sidelink channel state information (CSI), the transmitting equipment comprising:
a transmitter configured to transmit information indicating to report the sidelink CSI through a sidelink control information (SCI) format, and transmit sidelink CSI reference signal (RS) in association with the information indicating to report the sidelink CSI, to a receiving equipment;
a receiver configured to receive sidelink CSI reporting from the receiving equipment; and
a controller configured to acquire the sidelink CSI based on the sidelink CSI reporting,
wherein the sidelink CSI RS is transmitted within a resource assigned for a physical sidelink shared channel (PSSCH) transmission,
wherein the sidelink CSI RS is transmitted to the receiving equipment only if enabling information of the sidelink CSI reporting is received by the transmitting equipment,
wherein the SCI format includes a specific value in a field for the information indicating to report the sidelink CSI,
wherein a specific higher layer parameter is used for acquiring the sidelink CSI,
wherein the sidelink CSI RS is transmitted based on configuration information by a higher layer signaling, and
wherein the configuration information relates to a first parameter indicating a first orthogonal frequency division multiplexing (OFDM) symbol in a physical resource block (PRB) used for the sidelink CSI RS and a second parameter indicating a number of antenna ports and a frequency domain allocation for the sidelink CSI RS.

8. The transmitting equipment according to claim 7, wherein the transmitting equipment transmits the CSI RS to the receiving equipment based on the first OFDM symbol and the frequency domain allocation, within the resource assigned for PSSCH transmission.

9. The transmitting equipment according to claim 7,
wherein the SCI format includes PSSCH assignment information, and
wherein the enabling information of the sidelink CSI reporting is dynamically indicated by setting a value in an information region of the SCI format, the set value indicating to the transmitting receiver whether the sidelink CSI RS is to be transmitted through a PSSCH transmission corresponding to the PSSCH assignment information, the set value indicating to the receiving equipment whether the corresponding PSSCH transmission includes the sidelink CSI RS transmission.

* * * * *